United States Patent Office 3,159,652
Patented Dec. 1, 1964

3,159,652
PREPARATION OF GAMMA-PYRONES
Bryce E. Tate, Niantic, and Robert P. Allingham, Groton,
Conn., assignors to Chas. Pfizer & Co., Inc., New York,
N.Y., a corporation of Delaware
No Drawing. Filed June 13, 1962, Ser. No. 202,101
11 Claims. (Cl. 260—345.9)

This invention relates to new and useful gamma-pyrones and to processes for their preparation. More particularly, it is concerned with valuable intermediates useful in the preparation of maltol, a valuable gamma-pyrone, which is employed, for example, to impart enhanced flavor and aroma to a variety of foods. The present invention is also concerned with novel processes employing these intermediates in the synthesis of maltol.

As is disclosed in the copending application of B. E. Tate and R. L. Miller, S.N. 171,732, filed February 7, 1962, and now Patent No. 3,130,204, assigned to the assignee of the present application, it is now possible to prepare maltol from a readily available and economical gamma-pyrone, kojic acid, by a series of chemical transformations.

The process of the said copending application involves the oxidation of kojic acid to comenic acid, the decarboxylation thereof to form pyromeconic acid, hydroxymethylation thereof to form hydroxymaltol and reduction thereof to form maltol.

While the process therein disclosed produces maltol of good quality, in good yield, it is necessary as a final step to distill the maltol to obtain a product of highest purity and freedom from color.

It has now been found by the practice of this invention that it is possible to eliminate a distillation step and to combine the final distillation step with a decarboxylation step thus obtaining maltol of excellent purity and color more economically. These novel syntheses of maltol from the intermediates contemplated by the instant invention involve, in their final steps, the decarboxylation of 6-methylcomenic acid or the 2,3-dihydro-derivative thereof.

It is also found if maltol is made from 6-methylcomenic acid, one of the valuable new gamma-pyrones of the instant invention, that the choice of solvents for the decarboxylation step is much broader owing to its higher solubility compared to the corresponding comenic acid employed in the said copending application.

It is accordingly an object of this invention to prepare maltol from kojic acid whereby an expensive and yield-consuming distillation step is eliminated.

A further object of this invention is to provide an improved means to prepare maltol from kojic acid whereby the previous choice of decarboxylation solvents is broadened.

A still further object of this invention is to prepare new and valuable gamma-pyrone compounds among which are 6-methylcomenic acid, 6-methylkojic acid and 2,3-dihydro-6-methylcomenic acid.

These and other objects of the present invention will be apparent to those skilled in the art from the following description.

One of the new compounds of the present invention is 6-methylcomenic acid, a compound of the formula

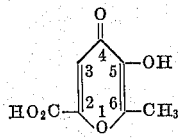

This valuable new crystalline compound has a melting point of 237.5–238.0° C.

The instant invention also contemplates 6-methylkojic acid, a compound of the formula

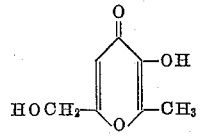

This valuable new crystalline compound has a melting point of 145–145.5° C.

Furthermore, the instant invention contemplates 2,3-dihydro-6-methylcomenic acid, a compound of the formula

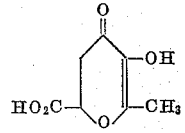

This valuable new crystalline compound has a melting point of 156–157° C.

In addition, the instant invention contemplates novel gamma-pyrones of the formula

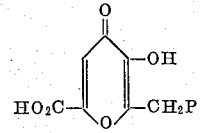

wherein P is selected from the group consisting of hydroxyl, di-lower alkylamino, said lower alkyl groups containing from one to about four carbon atoms, piperidino, morpholino, chloro, bromo and iodo.

Still another valuable gamma-pyrone contemplated by the instant invention is di-n-butylaminomethylkojic acid.

These valuable intermediates and maltol may be readily obtained from kojic acid according to the routes outlined in the following sequence and other reactions to be detailed hereinafter:

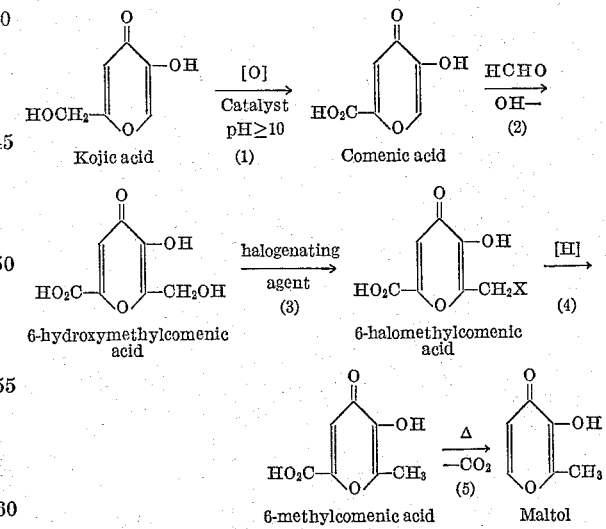

wherein X is chloro, bromo and iodo.

The first step in the sequence is carried out by the improved process of the aforesaid copending application which comprises adding oxygen to an aqueous solution of kojic acid adjusted to a pH of at least about 10 in the presence of a noble metal catalyst.

The second step in the sequence, conversion of comenic acid to the new compound 6-hydroxymethylcomenic acid, can be carried out by suspending comenic acid in from about 3 to about 10 parts by weight of water, adjusting the pH to about 10 by adding 50 wt. percent aqueous base such as, for example, sodium hydroxide, adding one mole equivalent of formaldehyde thereto, and keeping the resulting solution at a temperature of from about 15 to about 60° C. for from about 30 minutes to about 5 hours. The hydroxymethylcomenic acid can be isolated by adjusting the pH of the reaction mixture to below about 5 by adding aqueous acid, for example, 12 N hydrochloric acid. It is preferred to reduce the pH to below about 1 to minimize a tendency for the corresponding sodium salt to coprecipitate. The resulting slurry can be cooled to about 5° C., and the precipitated product can be removed by filtration. Concentration of the filtrate to about ⅕ volume affords an additional crop of 6-hydroxymethylcomenic acid. The combined yield of product is of the order of 90–95 percent of theoretical.

While it is to be understood that the present invention contemplates the direct conversion of 6-hydroxymethylcomenic acid to 6-methylcomenic acid by treatment with hydrogen in the presence of a noble metal catalyst in glacial acetic acid, or with chemical reducing agents such as, for example, sodium hydrosulfite, higher yields of 6-methylcomenic acid are obtained if the hydroxymethylcomenic acid is first converted to the corresponding halomethylcomenic acid and this intermediate is subsequently reduced. For the direct conversion of 6-hydroxymethylcomenic acid to 6-methylcomenic acid, suitable noble metal catalysts are, for example, palladium and platinum, employed in the form of the finely divided metals or suspended on supports such as carbon, charcoal, and the like. The reduction solvent is somewhat critical in this instance, glacial acetic acid affords highest yields, methanol somewhat less and in water, at pH 11, no reduction occurs at all.

With reference to Step (3) of the reaction process outlined hereinbefore, the 6-halomethylcomenic acid can be prepared by treatment of 6-hydroxymethylcomenic acid with halogen acid, for example, hydrogen bromide, hydrogen chloride or hydrogen iodide. An especially convenient procedure for the preparation of 6-bromomethylcomenic acid comprises treating a suspension of hydroxymethylcomenic acid in from about 3 to about 10 parts by weight of glacial acetic acid with dry hydrogen bromide gas. The gas is passed rapidly into the suspension whereupon the mixture spontaneously heats up to about 55–60° C. in about 15 minutes. Sufficient external heat is then applied to cause the temperature to rise 90 to 110° C. while the gas is introduced. The reaction is maintained under these conditions for an additional 1.5–2 hours, then is cooled to about 25° C. A small amount of sodium bromide by-product is removed by filtration and the solvent is concentrated at a pressure of about 20 mm. Hg to about ¾ of the original volume. The product, 6-bromomethylcomenic acid, can be isolated by filtration and can be further purified by recrystallization from an organic solvent such as, for example, ethyl acetate, acetic acid, and the like. There is obtained in yields corresponding to up to 90% of theory, 6-bromomethylcomenic acid, M.P. 197–197.5° C.

The preparation of 6-chloromethylcomenic acid is carried out in the same manner substituting gaseous hydrogen chloride for the corresponding hydrogen bromide. It is found in this case, however, that the yields tend to be lower unless about 5% by weight, based on hydroxymethylcomenic acid, of a strong mineral acid such as sulfuric or phosphoric acid is added.

With respect to Step (4), the reduction of 6-halomethylcomenic acid to 6-methylcomenic acid, this reaction can be carried out, for example, in the presence of chemical reducing agents such as sodium, potassium, lithium, calcium, magnesium, zinc and ammonium hydrosulfites or with hydrogen activated by noble metal catalysts such as, for example, platinum and palladium either in the form of the finely divided metals or supported on carbon or charcoal, and the like, or with a metal-acid reducing agent combination. It is especially preferred to use sodium hydrosulfite because this reagent is economical and readily available. For example, a solution of sodium hydrosulfite in from about 5 to about 10 parts per weight of water is adjusted to a pH of about 5.0–5.5 by the addition of a small amount of 1 N hydrochloric acid. To this is then added portionwise during about 15 minutes, about 0.66 molar equivalents of 6-bromomethylcomenic acid based on sodium hydrosulfite, and sufficient 1 N sodium hydroxide solution to maintain the pH, which tends to fall, at 5.0–5.5. The temperature of the mixture tends to spontaneously rise to about 40° C. To complete the reaction, the mixture is stirred for about one hour, then is heated to about 60° C. and is stirred for an additional 2 hours. Paper chromatographic analysis indicates that substantially all of the 6-bromomethylcomenic acid has been reduced after this time. 6-methylcomenic acid can be isolated by adjusting the pH of the reaction mixture to about 1 by addition of concentrated hydrochloric acid and, after a small amount of sulfur is filtered off and the filtrate is cooled to about 5° C., crystals of the acid precipitate. After filtration there is obtained 6-methylcomenic acid in excellent yield.

It is to be understood that by the term metal-acid reducing agent combinations as used herein and in the appended claims it is meant, as is obvious to those skilled in the art, combinations of acids with metals appropriately located in the electromotive series of the elements, which combinations provide a reducing action on compounds. As is mentioned in this sequence and those to be discussed subsequently, and as will be exemplified hereinafter, the term metal-acid reducing agent combinations contemplates as metals, for example, zinc, iron, aluminum, tin, magnesium, and the like, and as acids, strong mineral acids such as, for example, hydrochloric acid and sulfuric acid and monocarboxylic saturated, open-chain aliphatic acids that have from 1 to 10 carbon atoms and which are soluble in the reaction system, such organic acids being represented by, for example formic acid, acetic acid, isodecanoic acid and the like.

An alternative method for the reduction of 6-bromomethylcomenic acid comprises dissolving the compound in about 10 volumes of glacial acetic acid, adding a 5 percent palladium on carbon hydrogenation catalyst in an amount corresponding to about one percent by weight of palladium based on the 6-bromomethylcomenic acid and treating with hydrogen in a pressure apparatus until the theoretical amount has been absorbed. It is quite suitable and convenient to carry out this reaction at a pressure of about 50 p.s.i. of hydrogen. The product can be isolated by removing the catalyst by filtration, evaporating the solvent and recrystallizing the residue from ethyl acetate. By this procedure 6-methylcomenic acid is obtained in yields of up to about 90% of the theoretical.

Although both 6-iodo- and 6-chloromethylcomenic acids can be reduced to 6-methylcomenic acid according to the methods described, the yields tend to be lower and the product tends to be somewhat more difficult to isolate, than in the case of the 6-bromo compound; accordingly, it is preferred to employ the bromo compound.

With respect to Step (5), the decarboxylation of 6-methylcomenic acid to maltol, the improved process of said copending application may be employed substituting 6-methylcomenic acid for the comenic acid employed therein. For example, 6-methylcomenic acid can be suspended in from about 2 to about 5 parts by weight of decarboxylation solvent, for example, dimethyl phthalate, dibutyl carbitol, α-methylnaphthalene, and the like. The suspension is then stirred and heated; it is found that the comenic acid is almost completely in solution when the temperature reaches about 150° C. A vigorous evolution of carbon dioxide is observed when the temperature reaches about 220° C. The temperature is gradually increased to 250° C. over a period of about 20 to 25 minutes whereupon carbon dioxide evolution substantially ceases. To isolate the product, the reaction mixture can be cooled to 100° C., a vacuum corresponding to about 15 mm. of Hg is applied and the reaction mixture is heated to a temperature of from about 150 to about 250° C. whereupon maltol distills from the vessel at a vapor temperature of about 140–150° C. The distillate, which usually contains some decarboxylation solvent, is cooled and the maltol which crystallizes is removed by filtration and can be freed of solvent by washing with about 5 volumes of cold ethyl acetate. There is obtained maltol, in a yield corresponding to about 75% of theory, M.P. 157–160° C., eminently suitable for use as a flavor and aroma enhancer.

Alternatively, the 6-hydroxymethylcomenic acid can be treated with a metal-acid reducing agent combination and maltol can be prepared by an oxidative decarboxylation of the new intermediate formed thereby. This said intermediate, 2,3-dihydro-6-methylcomenic acid, is contemplated by the instant invention.

A convenient procedure comprises treating a mixture of hydroxymethylcomenic acid and about 2 molar equivalents of zinc suspended in about 5 parts by weight, based on the acid, of water with about 4 molar equivalents of concentrated hydrochloric acid. The mixture is stirred at about 60° C. for about one hour then the unreacted zinc is removed by filtration. An amount of oxalic acid solution equivalent to about 0.9 molar equivalent of zinc originally taken is added and the zinc oxalate which precipitates is removed by filtation. The filtrate is adjusted to a pH of about 1 by adding 50% aqueous sodium hydroxide solution and the solvent is evaporated in vacuo. The product can be isolated by extracting the residue with a small volume of glacial acetic acid and filtering off the insoluble organic salts after which the acetic acid is evaporated in vacuo and the residue is recrystallized from ethyl acetate. The 2,3-dihydro-6-methylcomenic acid is oxidatively decarboxylated to form maltol by dissolving the crystalline material in about 30 parts by weight of glacial acetic acid and adding an equimolar amount of lead tetraacetate. The temperature of the mixture spontaneously rises to about 30° C. and after an hour at 25–30° C., maltol is indicated by paper chromatography to be present in the reaction mixture. The reaction is taken to completion by heating the mixture for one hour at 40° C., for an additional hour at 60° C. and finally for an additional hour at reflux temperatures. The maltol is isolated in 70% yield by cooling the reaction mixture to 25° C., diluting with an equal volume of water and extracting the mixture once with an equal volume of chloroform and once with an equal volume of ether and finally evaporating the combined organic extracts. It can be further purified by recrystallization from hot water.

Another process for the preparation of the valuable gamma-pyrones of the instant invention involves the so-called Mannich intermediates. Thus, maltol can be prepared from kojic acid via another of the new intermediates contemplated by the instant invention, 6-N,N-disubstituted-aminomethylcomenic acid. This process is represented by the following reaction sequence:

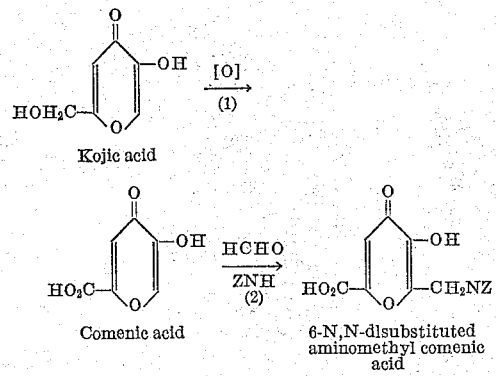

wherein ZN is selected from the group consisting of di-lower alkylamino, said alkyl groups containing up to about 4 carbon atoms, piperidino and morpholino.

Step (1) of the sequence, the oxidation of kojic acid to comenic acid, is carried out by the process described in said copending application.

Step (2) of the reaction sequence, the conversion of comenic acid to the corresponding Mannich derivative, can readily be carried out by techniques to be exemplified in detail hereinafter. For example, a solution of secondary amine, such as morpholine, piperidine, dimethylamine, di-n-butylamine, and the like, in about ten volumes of ethanol or water can be treated at 25° C. with an equimolar amount of 37% aqueous formaldehyde and, after stirring the mixture of 15 minutes, an amount of comenic acid approximately equivalent to 0.75 molar equivalent of amine originally taken is added, preferably all at one time. After about 5 minutes of stirring at about 30° C., all of the comenic acid has gone into solution and, after an additional ten minutes, the corresponding 6-N,N-disubstituted-aminomethylcomenic acid crystallizes out. To complete the reaction, the reaction mixture can be stirred for about an additional hour. To isolate the product, it is preferred to allow the mixture to stand for about 16 hours at 25° C. then to collect the crystals on a filter. After drying in the air, there is obtained the product in an amount corresponding to a yield of from about 80 to about 95 percent of theoretical.

With respect to the Step (3) of the process, the reduction of 6-N,N-disubstituted-aminomethylcomenic acid to the corresponding 6-methylcomenic acid, this can be carried out with chemical reducing agents such as, for example, sodium hydrosulfite, lithium hydrosulfite, potassium hydrosulfite, calcium hydrosulfite, magnesium hydrosulfite, zinc hydrosulfite or ammonium hydrosulfite. Since certain difficulties are encountered with respect to isolation of the product if other reducing agents such as for example, metal-acid reducing agent combinations or hydrogen in the presence of a noble metal catalyst are employed, it is preferred to use hydrosulfite salts for this purpose. Reduction with sodium hydrosulfite may be carried out in accordance with the procedure described hereinbefore for the reduction of the corresponding 6-hydroxymethylcomenic acid, and is exemplified in detail hereinafter.

Maltol may be made by decarboxylation of 6-methylcomenic acid as described hereinbefore.

The valuable new gamma-pyrones of the instant invention may also be prepared by a synthetic route which proceeds via 6-methylkojic acid, one of the valuable new intermediates disclosed and claimed herein. This procedure is outlined in the following reaction sequence:

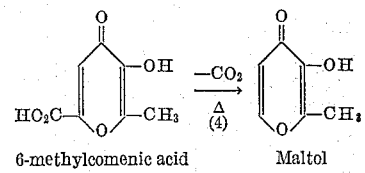

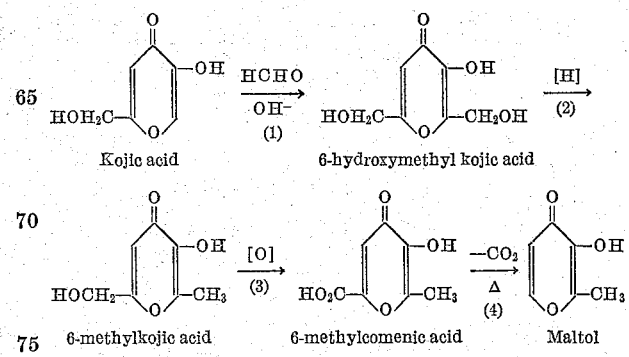

With respect to Step (1), the hydroxymethylation of kojic acid, 6-hydroxymethylkojic acid can be obtained in yields of up to 90 percent according to the following general procedure: Kojic acid is suspended in about 4 parts by weight of water and to this is added enough 50% by weight sodium hydroxide solution to bring the pH of the mixture to at least about 8. To the resulting mixture is added 1 molar equivalent based on the kojic acid of formaldehyde as a 37% aqueous solution and the reaction mixture is allowed to stand at about 25° C. for about 2 hours. The reaction mixture is then acidified to a pH of about 1 by adding 50% by weight of acid such as, for example, sulfuric, hydrochloric, and the like. After cooling the suspension to about 5° C., the product can be collected by filtration. An additional amount can be obtained by concentration of the filtrate in vacuo to about ⅕ volume. The product can be purified by recrystallization from methanol to obtain 6-hydroxymethylkojic acid, M.P. 148–150° C.

The reduction of 6-hydroxymethylkojic acid to the new compound, 6-methylkojic acid, Step (2), can readily be carried out according to the following procedure. A suspension of 6-hydroxymethylkojic acid in from about 5 to about 10 volumes of water and containing about 2 molar equivalents of zinc metal dust, based on the acid, is treated by the dropwise addition of about 4 molar equivalents of concentrated hydrochloric acid. Such addition is conveniently carried out at a rate so that the temperature does not rise above about 65° C.; the time required is approximately 15 minutes. To complete the reaction, the mixture can then be heated and stirred at about 60 to 70° C. for an additional 1.5 hours. The product can be isolated by heating the suspension to about 90° C., filtering to remove unreacted zinc metal, adjusting pH of the filtrate to about 2 by the addition of 12 N sodium hydroxide solution and allowing the suspension to stand at 5° C. until crystallization is complete; about 16 hours is sufficient. The product which crystallizes can be collected upon a filter and dried in the air at about 25° C. There is obtained in about 50% yield 6-methylkojic acid. A small additional amount of product can be obtained by concentration of the filtrate to about one-fifth volume followed by extraction with about 5 volumes of solvent such as chloroform, evaporation of the solvent layer, and recrystallization of the residue from an alcohol such as, for example, isopropanol.

With respect to Step (3), the oxidation of 6-methylkojic acid to 6-methylcomenic acid, the procedure is substantially the same as that described in the aforesaid copending application for the oxidation of kojic acid to comenic acid and is exemplified in detail hereinafter. For example, 6-methylkojic acid is suspended in from about 4 to about 10 volumes of water and approximately 2 molar equivalents of sodium hydroxide are added as a 50% aqueous solution. After the reaction mixture is completely homogenous, from about 1 to about 3% of palladium based on 6-methylkojic acid is added as a 5% palladium on carbon catalyst suspended in 50% by weight of water. The reaction mixture is then maintained at about 30° C. by external cooling and air is blown into the reaction mixture at a rate of about 5 milliliters per minute per gram of 6-methylkojic acid for about 16 hours. The product is isolated by removing the catalyst by filtration and acidifying the filtrate with concentrated hydrochloric acid to a pH of below about 1. Light colored crystals separate and, after cooling to 5° C., the product is collected on a filter and is dried in the air at about 25° C. There is obtained 6-methylcomenic acid in a yield corresponding to up to about 80% of the theoretical amount.

Maltol is prepared by decarboxylation of 6-methylcomenic acid as is described hereinabove and exemplified hereinafter.

An alternative process for the preparation of 6-methylkojic acid involves the preparation of the corresponding Mannich base from kojic acid. This procedure is outlined in the following sequence of reactions:

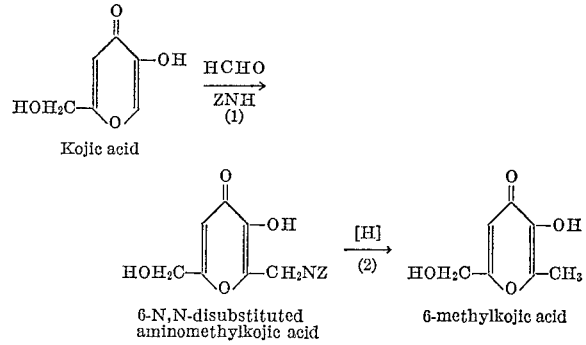

wherein ZN is selected from the group consisting of di-lower alkylamino, said alkyl groups containing up to about 4 carbon atoms, piperidino and morpholino.

With respect to Step (1) of the reaction, the conversion of kojic acid to the corresponding Mannich derivative, this reaction may be carried out according to the general technique described for the preparation of the corresponding Mannich derivative of comenic acid described hereinbefore. For example, a solution of secondary amine, such as morpholine, piperidine, dimethylamine, di-n-butyl amine, or the like, in from about 5 to about 15 volumes of water or alcohol such as, for example, ethanol, is treated with an equimolar amount of formaldehyde conveniently taken as a 37% aqueous solution and the resulting mixture is stirred vigorously for 15 minutes. Then kojic acid in an amount corresponding to about 0.75 molar equivalent of secondary amine is added rapidly. After about five minutes, most of the kojic acid has gone into solution and after about ten minutes, the Mannich product begins to crystallize and separate from the reaction mixture. The reaction mixture is stirred for an additional 45 minutes, then is allowed to stand for an additional 12 to 16 hours. The product is collected by suction filtration and is dried in the air at about 25° C. There is obtained, in yields corresponding to from about 75 to about 95%, the 6-N,N-disubstituted aminomethylkojic acid.

With respect to Step (2), the reduction of the 6-Mannich derivative of kojic acid to the novel 6-methylkojic acid of the instant invention, it is convenient to carry out this reaction in the presence of metal-acid reducing agent combinations. For example, a suspension is prepared containing the 6-N,N-disubstituted aminomethylkojic acid in from about 3 to about 10 parts by weight of water and about 2 gram atoms of zinc metal dust is added. This mixture is stirred and there is added from about 2.5 to about 5 equivalents of concentrated hydrochloric acid at such a rate that the temperature can be maintained in the range of 50–55° C.; this requires about 30 minutes. After the acid has been added, the reaction is completed by heating and stirring at 50–55° C. for an additional 1.5 hours. The product is isolated by filtering off the unreacted zinc metal at about 90° C., adjusting the pH of the filtrate to about 2.0 with 50% aqueous sodium hydroxide solution and cooling the resulting suspension to 5° C. The pH is then increased to about 10 by the addition of more aqueous sodium hydroxide, the precipitated zinc hydroxide is removed by filtration and the filtrate is re-adjusted to pH 2.0 by the addition of concentrated hydrochloric acid. The acidic solution is concentrated in vacuo to about one-fifth volume and the concentrate is cooled to 5° C. After having allowed the suspension to stand for about 48 hours at 5° C., the crystalline product, which has precipitated, is collected. There is obtained in good yield, 6-methylkojic acid.

6-methylcomenic acid is prepared by oxidation of 6-methylkojic acid as described hereinbefore and exemplified hereinafter. Maltol is prepared by the decarboxylation of 6-methylcomenic acid as described hereinbefore and exemplified hereinafter.

The following examples are illustrative of the processes of this invention.

Example I

In an 8-liter stainless steel vessel fitted with a stirrer and an air sparger is placed a suspension of 350 grams of kojic acid in 3500 ml. of water. The pH is adjusted to 11.1 by addition of 256 ml. of 50 percent aqueous sodium hydroxide and then 142 g. (7.1 g. as metal) of a 5 percent palladium on charcoal catalyst is added. Air is passed into the suspension at a rate of 6 ml. per minute per gram of kojic acid. The reaction, which is slightly exothermic, is maintained at a temperature of about 20–22° C. by occasional application of external cooling. After 11 hours the reaction mixture is filtered to remove the catalyst and is treated with 600 ml. of concentrated hydrochloric acid. The crystals of comenic acid which precipitate from the pH 0.5 mixture are removed by filtration, washed with a small amount of cold water and are air-dried. There is obtained 328 g. of product. This is 85.3 percent of the theoretical yield. Titration data indicate the product to be 99.2 percent pure; therefore, there is obtained an 84.6 percent yield of comenic acid as corrected for purity.

Example II

Comenic acid, 156 g., 1 mol, is mixed with 550 ml. of water, and the pH is adjusted to 10 with a 50% aqueous sodium hydroxide solution. The mixture is treated with 83.1 g. of 37% aqueous formaldehyde and is stirred at 25° C. for 1.5 hours. The pH is then adjusted to 0.8 by the addition of concentrated hydrochloric acid, 300 ml. of water is added and the suspension is cooled to 5° C. and filtered. There is obtained 209 g. of product; this represents a nearly quantitative yield. The product when analyzed indicates that 6-hydroxymethylcomenic acid is partially present in the form of its sodium salt.

The crude 6-hydroxymethylcomenic acid is converted completely to the free acid by dissolving 7.88 g. in 175 ml. of boiling acetic acid and treating the hot mixture with a solution of 1 g. of concentrated sulfuric acid in 20 ml. of acetic acid. The precipitate of inorganic salt which forms is removed by filtration and the filtrate is evaporated to one-half volume and the product is allowed to crystallize at 25° C. The crystalline product is collected by filtration and weighs 2.5 g. Evaporation of the filtrate to one-half volume affords a second crop weighing 0.38 g. Recrystallization of the first crop from hot water yields a material with a melting point of 178–179° C. and having a neutral equivalent of 187 and 94.1; values calculated for 6-hydroxymethylcomenic acid are 186 and 93.

Analysis.—Calcd. for $C_7H_6O_6$: C, 45.16; H, 3.23. Found: C, 45.42, 45.16; H, 3.41, 3.32.

Example III

A series of reactions is carried out by the procedure of Example II except that the pH of the reaction mixtures are 3, 5, 7 and 9. No product can be detected by paper chromatographic assay after the reactions at pH 3 and 5. After carrying out the reaction at pH 7, a small amount of product can be detected after 45 minutes of reaction time. After carrying out the reaction at pH 9, a moderate yield of 6-hydroxymethylcomenic acid is formed, but considerable comenic acid material is still present after 2 hours. In contrast, the procedure of Example II at pH 10 led to nearly complete conversion of comenic acid to 6-hydroxymethylcomenic acid after about 1.5 hours.

Example IV 6-hydroxymethylcomenic acid prepared as in Example II, 1.97 g., is mixed with 0.5 g. of 5% palladium on carbon catalyst (50% in water), 200 ml. of glacial acetic acid and 0.25 ml. of concentrated sulfuric acid. The mixture is agitated in a hydrogen atmosphere at an initial pressure of 50 pounds and, after 41 minutes, a pressure drop of 13 pounds, equivalent to 0.01 mole of hydrogen, is observed. The mixture is evaporated in a vacuum corresponding to about 1 mm. Hg to a small volume and is allowed to crystallize. About 0.7 g. of crystals are collected by filtration; paper chromatography indicates that they are comprised of 6-hydroxymethylcomenic acid and methylcomenic acid in approximately equal amounts.

The procedure is repeated substituting the following catalysts for palladium on carbon on an equal weight based on the metal basis: platinum black, palladium black, platinic oxide and platinum on carbon. Substantially the same results are obtained.

Example V

Dry hydrogen bromide gas is passed rapidly into a stirred mixture of crude 6-hydroxymethylcomenic acid, 35 g., 0.18 mole, and glacial acetic acid, 210 cc. The temperature rises to 55–60° within 15 minutes, then the mixture is heated to 90–110° C., is maintained at that temperature for 2 hours and then is cooled to 30° C. The reaction mixture is filtered, the filtrate is concentrated in a vacuum corresponding to about 5 mm. of Hg to one-sixth volume, and the crystals which precipitate are removed by filtration. There is obtained 39.1 g. of 6-bromomethylcomenic acid corresponding to a 90% yield of theory. An additional small amount of product is obtained by concentration of the filtrate to one-half volume. Recrystallization of the crude product from ethyl acetate gives pure 6-bromomethylcomenic acid, M.P. 197–197.5° C.

Analysis.—Calcd. for $C_7H_5O_5Br$: C, 33.75; H, 202. Found: C, 33.78; H, 1.94.

The same procedure is carried out substituting hydrogen chloride for hydrogen bromide and 20 g. of 6-hydroxymethylcomenic acid is converted to 14.4 g. of 6-chloromethylcomenic acid.

The procedure is repeated substituting hydrogen iodide for the corresponding hydrogen bromide. 6-iodomethylcomenic acid is obtained.

Example VI 6-bromomethylcomenic acid, 1.24 g., is mixed with 100 ml. of glacial acetic acid, 0.5 g. of a 5% palladium on carbon catalyst (50% in water) and 0.385 g. of ammonium acetate and the mixture is shaken in an atmosphere of hydrogen at 25° C. and at an initial pressure of 50 pounds per square inch. The calculated amount of hydrogen is absorbed in 15 minutes. The reaction is stopped, the mixture is filtered and the filtrate evaporated in vacuo. There is obtained 1.18 g. of crystalline residue. Recrystallization of the residue from a 1:1 acetone-water mixture affords 6-methylcomenic acid, M.P., 237–238° C. (decomposition).

The procedure is repeated substituting 4.1 g. of 6-chloromethylcomenic acid prepared as in the preceding example; 80% of the theoretical amount of hydrogen is absorbed in 75 minutes. Evaporation of the filtered reaction mixture yields an oily product; this is crystallized from acetone to yield 1.8 g. of material melting at 228–232° C.

The procedure is repeated substituting 6-iodomethylcomenic acid for the corresponding 6-bromomethylcomenic acid. Substantially the same results are obtained.

Example VII 6-bromomethylcomenic acid, 5.0 g., 0.02 mole, is added portionwise during 15 minutes to a stirred mixture of 35 ml. of water and 5.22 g., 0.03 mole, of sodium hydrosulfite while the pH of the mixture is kept between 5 and 5.5 by incremental addition of 1 N sodium hydroxide. The mixture, which warms to 40° C. spontaneously, is stirred for an additional hour, then is heated to 58–63° C. and stirred for an additional 2.25 hours. It is then acidified with concentrated hydrochloric acid to pH 0.9, the white precipitate which forms is removed by filtration, and the filtrate is allowed to be cooled to 5° C. and crystals are formed. Filtration provides 1.462 g., 46% yield, of 6-methylcomenic acid, M.P. 237.5–238.0° C. A small amount of additional product can be isolated from the filtrate by concentration to ½ volume, cooling and filtering.

The procedure is repeated substituting for the sodium hydrosulfite the following salts: lithium hydrosulfite, potassium hydrosulfite, calcium hydrosulfite, magnesium hydrosulfite, zinc hydrosulfite and ammonium hydrosulfite. Substantially the same results are obtained.

The procedure is repeated substituting for the 6-bromomethylcomenic acid the following: 6-chloromethylcomenic acid and 6-iodomethylcomenic acid. Substantially the same results are obtained.

*Example VIII*

6-methylcomenic acid, 3.0 g., 0.012 mole, is suspended in 12 ml. of dimethyl phthalate in a 25 ml. 3-neck round-bottomed flask equipped with mechanical stirrer, thermometer and short distillation head connected in turn to a round-bottomed receiver. The mixture is stirred and heated and it is found that most of the methylcomenic acid has dissolved when the temperature reaches 150° C. When the temperature reaches about 215° C., vigorous evolution of carbon dioxide occurs and this continues for about 15 minutes. The external temperature is allowed to rise to 250° C., then the mixture is cooled to about 100° C. and a vacuum of about 20 mm. of Hg is applied. The reaction mixture is distilled at an external temperature of about 180–250° C. and distillation is continued until very little material remains in the flask. Most of the distillation occurs at vapor temperature of 140–150° C. The distillate is cooled to 15° C. and the crystalline material which precipitates is collected by suction filtration. The product is washed with 5 ml. of ethyl acetate and is dried. There is obtained maltol in good yield, M.P. 157–160° C.

The procedure is repeated using 10.0 g. of 6-methylcomenic acid and 40 ml. of dibutyl carbitol. The reaction mixture is heated in the range of 230–245° C. for about 45 minutes, then is distilled as described in the preceding procedure. The distillate is cooled to 25° C. and maltol is collected upon a filter then is dissolved in 30 ml. of hot water, the solution is filtered hot, is cooled to 10° C. and maltol is allowed to crystallize. The maltol is collected upon a filter and air dried. Further concentration of the filtrate to ⅓ volume and filtration to remove the crystalline precipitate affords a small additional amount of product.

The procedure is repeated substituting 25 ml. of α-methylnaphthalene for the corresponding 40 ml. of dibutyl Carbitol. There is obtained maltol, M.P., 160–161.5° C., in good yield.

*Example IX*

A mixture of morpholine, 46.8 g., 0.534 mole, formaldehyde, 37% aqueous, 42.8 g., 0.534 mole, and anhydrous ethanol, 534 ml., is stirred for 15 minutes. Comenic acid, 62.4 g., 0.4 mole, is added all at once, and the mixture is stirred at room temperature for one hour, cooled to 10° C., and filtered. The 6-morpholinomethylcomenic acid weighs 99 g. A recrystallized sample, M.P. 173–174° C., had the following analysis: C, 48.61; H, 5.51; N, 5.23. Calcd. for $C_{11}H_{13}NO_6$—$H_2O$: C, 48.35; H, 5.53; N. 5.13. Calculated as the monohydrate, the crude yield was 91%.

The procedure is repeated substituting a molecular equivalent amount of piperidine for morpholine. 6-piperidinomethylcomenic acid is obtained.

The procedure is repeated substituting a molecular equivalent of dimethylamine for the morpholine. 6-dimethylaminomethylcomenic acid is obtained.

The procedure is repeated substituting a molecular equivalent of di-n-butylamine for the morpholine. 6-di-n-butylaminomethylcomenic acid is obtained.

*Example X*

6-morpholinomethylcomenic acid, 5.1 g., 0.02 mole, is added portionwise to a mixture of sodium hydrosulfite, 5.22 g., 0.03 mole, and 35 ml. of water while the pH was maintained between 5.0 and 6.0 by the addition of 12 N sodium hydroxide solution as needed. The addition requires 15 minutes and the temperature rises to 42° C. No product can be detected by paper chromatography after stirring the mixture at ambient temperature for 15 minutes. The mixture is then heated to reflux temperature and after 15 minutes at this temperature, paper chromatography indicates the presence in the reaction mixture of 6-methylcomenic acid in moderate yield.

The procedure is repeated substituting for the 6-morpholinomethylcomenic acid the following: 6-piperidinomethylcomenic acid, 6-dimethylaminomethylcomenic acid and 6-di-n-butylaminomethylcomenic acid. Substantially the same results are obtained.

The procedure is repeated substituting for the sodium hydrosulfite, stoichiometrically equivalent amounts of the following: lithium hydrosulfite, potassium hydrosulfite, calcium hydrosulfite, magnesium hydrosulfite, zinc hydrosulfite and ammonium hydrosulfite. Substantially the same results are obtained.

*Example XI*

In a 2-l. 3-necked round-bottomed flask equipped with stirrer is placed kojic acid, 142 g., 1.0 mole, and 500 ml. of water. To this is added 50 ml. of 50% aqueous sodium hydroxide solution and the pH of the resulting mixture reaches 10. After the reaction stands for five minutes a small amount of crystalline material begins to separate. To the mixture then is added 76 ml. of 37% aqueous formaldehyde. The reaction mixture becomes homogeneous and is allowed to stand at 25° C. for 2 hours. The mixture then is treated with 65 ml. of 50 wt. percent aqueous sulfuric acid solution and is cooled to 5° C. whereupon 6-hydroxymethylkojic acid crystallizes from solution. The crystals are collected upon a filter, are partially air-dried and then are dissolved in 500 ml. of hot methanol, the solution is filtered while hot, and allowed to cool and the product crystallizes at 20 degrees C. The crystals are collected upon a filter and after air-drying weigh 81.1 g., M.P., 148–150° C. A further 21.0 g. of 6-hydroxymethylkojic acid is obtained by concentration of the methanol filtrate to about ¼ volume. Concentration of the aqueous filtrate affords additional 38.7 g. of product. There is obtained a total of 140.8 g. of 6-hydroxymethylkojic acid, an 81% yield of the theoretical.

*Example XII*

In a 500-ml. flask fitted with stirrer, thermometer, condenser and addition funnel are placed 180 ml. of water, 6-hydroxymethylkojic acid prepared as in Example XI, 34.4 g., 0.2 mole, and zinc metal dust, 26.0 g., 0.4 mole. To this mixture is added dropwise 95 ml., 1.13 eq., of concentrated hydrochloric acid at such a rate that the temperature does not rise about 65° C.; the time required is approximately 15 minutes. The reaction mixture is then stirred and heated at 60 to 70° C. for an additional 1.5 hours. The mixture then is heated to 90° C. and filtered to remove unreacted zinc metal. The pH of the filtrate is adjusted to about 2.0 by the addition of 12 N sodium hydroxide solution and the resulting mixture is allowed to stand at 5° C. for 12 hours. The yellow product which crystallizes is collected on a filter, pressed free of solvent and air-dried. The 6-methylkojic acid weighs 13.9 g., 45% yield of theory, M.P. 138–140° C.

6-methylkojic acid is further purified by dissolving 15.2 g. in 30 ml. of hot water and the resulting mixture is cooled to 5° C. whereupon the product crystallizes. The product is removed by filtration and is dried in a desiccator over phosphorous pentoxide. After a further recrystallization from an equal weight methanol there is obtained 6-methylkojic acid, M.P., 145–145.5° C.

*Analysis.*—Calcd. for $C_7H_8O_4$: C, 53.84; H, 5.16. Found: C, 54.05; H, 5.08.

An ultraviolet absorption spectrum for this compound in ethanol solution has maxima at 245 m$\mu$, $\epsilon=4,840$ and 276 m$\mu$, $\epsilon=7,950$, respectively.

The procedure is repeated substituting for the zinc dust, stoichiometrically equivalent amounts of the following metals: iron, aluminum, tin and magnesium. Substantially the same results are obtained.

The procedure is repeated substituting for the hydrochloric acid stoichiometrically equivalent amounts of the following acids: sulfuric, formic, acetic and isodecanoic. With the C–10 acid, it is desirable to add an appropriate quantity of a co-solvent to the predominately aqueous system to promote solubility. Substantially the same results are obtained.

*Example XIII*

In a 500-ml. flask is placed 40 g., 0.26 mole, of 6-methylkojic acid, 270 ml. of water and 20.5 g., 0.512 mole, of sodium hydroxide. After all of the solids have gone into solutions, 27.5 g. of a 5% palladium on charcoal catalyst containing 50 wt. percent of water is added. This is equivalent to 1.72% of palladium by weight of 6-methylkojic acid. The reaction mixture is cooled by the external application of a water bath and the temperature is maintained at 30° C. while air is blown through the reaction mixture at a rate of about 200–250 ml. per minute for 16 hours. After this time, the catalyst is collected upon a filter and then the filtrate is acidified with concentrated hydrochloride acid to a pH of below 1. A light orange-colored product crystallizes from the mixture, and after cooling well in an ice bath, the product is collected upon a filter and is air-dried. There is obtained 34.0 g. of 6-methylcomenic acid, M.P., 233–235° C., with decomposition, a 78% yield of theoretical. This product is converted to maltol in good yield by the method described in Example VIII.

*Example XIV*

In a 12-l. flask are placed 3.5 liters of ethanol, 350 g., 4.0 moles, or morpholine and 320 g., 4.0 moles, of 37% aqueous formaldehyde. The reaction mixture is stirred for about 5 minutes during which time it is observed to warm slightly, then is stirred vigorously for 14 minutes. To the reaction mixture is added 430 g., 3.0 moles, of kojic acid all at once together with an additional 250 ml. of ethanol. After about 5 minutes of stirring, most of the kojic acid has gone into solution and, after about 10 minutes, the product is observed to crystallize out. The reaction mixture is stirred for an additional 45 minutes, then is allowed to stand overnight. The crystals are collected upon a filter, and are air-dried. After drying, 6-morpholinomethylkojic acid, 632 g., M.P., 164–165° C., is obtained. This corresponds to an 88% yield of the theoretical.

The procedure is repeated substituting for morpholine, stoichiometrically equivalent amounts of the following amines: piperidine, dimethylamine and di-n-butylamine. There are obtained respectively, 6-piperidinomethylkojic acid, 6-dimethylaminomethylkojic acid and 6-di-n-butylaminomethylkojic acid.

*Example XV*

In a 2-l. round-bottom flask equipped with stirrer, condenser, thermometer and addition funnel is placed 96.4 g., 0.4 mol, of 6-morpholinomethylkojic acid, zinc metal dust, 52 g., 0.8 g-atoms, and 720 ml. of water. To this mixture is added 225 ml., 2.67 equivalents, of concentrated hydrochloric acid at such a rate that the temperature remains in the 50–55° C. range; the addition requires about 30 minutes. After all the acid has been added, the reaction mixture is stirred and heated at 50–55° C. for an additional 1.5 hours. The reaction mixture then is heated to 90° C. and unreacted zinc metal is recovered by filtration. The light yellow filtrate is treated with 65 ml. of 50% aqueous sodium hydroxide solution during which time the pH reaches about 2. The resulting mixture is cooled to 5° C. in an ice-water bath, then the pH is raised to 10 by the addition of 85 ml. of additional 50% sodium hydroxide solution. The zinc hydroxide which precipitates is removed by filtration, the filter cake is washed with 25 ml. of water and the washings are combined with the original filtrate. The pH of the filtrate is adjusted to 2.0 by the addition of about 65 ml. of concentrated hydrochloric acid. The acidic solution is concentrated to about one-fourth volume at a pressure corresponding to about 20 mm. Hg. The concentrate is cooled to 5° C. and is allowed to stand for 48 hours. The crystalline product which precipitates is collected upon a filter and is air-dried. There is obtained 22.7 g. of 6-methylkojic acid, 36% yield of theoretical, M.P., 133–136° C. This product can be further purified by recrystallization from an equal weight of methanol, M.P., 144–145° C.

The procedure is repeated substituting for the 6-morpholinomethylkojic acid, stoichiometrically equivalent amounts of the following Mannich bases: 6-piperidinomethylkojic acid, 6-dimethylaminokojic acid, 6-di-n-butylaminokojic acid. Substantially the same results are obtained.

The procedure is repeated substituting for the zinc dust, stoichiometrically equivalent amounts of the following metals: iron, aluminum, tin and magnesium. Substantially the same results are obtained.

The procedure is repeated substituting for the hydrochloric acid stoichiometrically equivalent amounts of the following acids: sulfuric, formic, acetic and isodecanoic. With the C–10 acid, it is desirable to add an approprite quantity of a co-solvent to the predominately aqueous system to promote solubility. Substantially the same results are obtained.

6-methylkojic acid is converted by the procedure of Example XIII to 6-methylcomenic acid and maltol is formed therefrom by the procedure of Example VIII.

*Example XVI*

The procedure of Example XV is repeated substituting, respectively, for the 6-morpholinomethylkojic acid stoichiometrically equivalent amounts of the following: 6-bromomethylcomenic acid, 6-chloromethylcomenic acid and 6-iodomethylcomenic acid prepared as described in Example V. There is obtained 6-methylcomenic acid.

*Example XVII*

To a suspension of 20 g. (0.1 mole) of 6-hydroxymethylcomenic acid (prepared as in Example II) and 13.1 g. (0.2 mole) of zinc metal dust in 130 ml. of water is added, during 10 minutes, 35 ml. of concentrated hydrochloric acid. The temperature rises from 25° to 60° and then the mixture is filtered to remove 1.7 g. of unreacted zinc metal and the filtrate is treated with an aqueous solution of 22.5 g. (0.178 mole) of oxalic acid. The precipitated zinc oxalate is removed by filtration, the filtrate is adjusted to pH 1 by addition of 20% aqueous sodium hydroxide solution, and the mixture is evaporated to dryness in vacuo. The residue is mixed with 4 parts by weight of glacial acetic acid and insoluble organic salts are removed by filtration. Evaporation of the filtrate in vacuo and trituration of the residue with hot ethyl acetate followed by cooling affords 2.6 g. of 2,3-dihydro-6-methylcomenic acid, M.P., 156–157° C. A second crop, 2.91 g., is obtained by evaporation of the filtrate to ⅕ volume and filtering of the crystals which form. The combined yield is 32%. Neutral equivalent, calcd., 172; found, 174.

*Analysis.*—Calcd. for $C_7H_8O_5$: C, 48.84; H, 4.68. Found: C, 49.11; H, 4.78.

The procedure is repeated substituting for the zinc dust, stoichiometrically equivalent amounts of the following metals: iron, aluminum, tin and magnesium. Substantially the same results are obtained.

The procedure is repeated substituting for the hydrochloric acid stoichiometrically equivalent amounts of the following acids: sulfuric, formic, acetic and isodecanoic. With the C-10 acid, it is desirable to add an appropriate quantity of a co-solvent to the predominately aqueous system to promote solubility. Substantially the same results are obtained.

*Example XVIII*

2,3-dihydro-6-methylcomenic acid, 1.72 g., 0.01 mole, is dissolved in 50 ml. of glacial acetic acid and the solution is treated with 4.53 g., 0.01 mole of lead tetraacetate. Within a few minutes, the temperature rises from 24° to 30°. The mixture is stirred at 25° C. for one hour, then is heated to 41° C. and stirred for 1 hour, during which time 30 cc. of $CO_2$ is evolved. The mixture is then heated to 62° C. for an hour during which time 20 cc. of $CO_2$ is evolved. The mixture is finally heated to refluxing and stirred at this temperature for an hour during which time an additional 110 cc. of $CO_2$ is evolved. The mixture is cooled to 25° C. and is diluted with an equal volume of water then is extracted twice with equal volumes of chloroform and twice with an equal volume of ether. The organic extracts are combined, dried with 10 wt. percent of anhydrous sodium sulfate, and the solvents are evaporated. There is obtained 0.85 g. of maltol, a yield corresponding to 67% of the theoretical.

*Example XIX*

The procedure of Example VI is repeated substituting for the 6-bromomethylcomenic acid, stoichiometrically equivalent amounts of the following: 6-morpholinomethylcomenic acid, 6-piperidinomethylcomenic acid, 6-dimethylaminomethylcomenic acid and 6-di-n-butylaminomethylcomenic acid. 6-methylcomenic acid is obtained.

What is claimed is:

1. A process for the preparation of maltol which comprises treating kojic acid wth formaldehyde and a reagent selected from the group consisting of alkali metal hydroxides, di-lower alkylamines, said alkyl radicals each containing up to about four carbon atoms, piperidine and morpholine at a pH of at least about 5 to form a compound of the formula

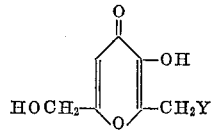

wherein Y is selected from the group consisting of hydroxyl, di-lower alkylamino, piperidino and morpholino; treating said compound under reducing conditions with a metal-acid reducing agent combination to form 6-methylkojic acid; oxidizing said compound to 6-methylcomenic acid and decarboxylating 6-methylcomenic acid to form maltol.

2. A process for the preparation of maltol which comprises treating an aqueous solution of kojic acid, adjusted to a pH of at least about 10, with oxygen in the presence of a noble metal catalyst to form comenic acid; treating said comenic acid with formaldehyde at a pH of at least about 7 to form 6-hydroxymethylcomenic acid; treating said compound with a reagent selected from the group consisting of hydrogen chloride, hydrogen bromide and hydrogen iodide to form a compound of the formula

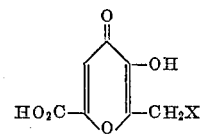

wherein X is selected from the group consisting of chloro, bromo and iodo; treating said compound under reducing conditions with a reagent selected from the group consisting of hydrogen activated by noble metal catalysts, alkali metal hydrosulfites, alkaline earth metal hydrosulfites, zinc hydrosulfite, ammonium hydrosulfite and metal-acid reducing agent combinations to form 6-methylcomenic acid and decarboxylating said compound to form maltol.

3. A process for the preparation of maltol which comprises treating an aqueous solution of kojic acid adjusted to a pH of at least about 10 with oxygen in the presence of a noble metal catalyst to form comenic acid; treating said comenic acid with formaldehyde at a pH of at least about 7 to form 6-hydroxymethylcomenic acid; treating said 6-hydroxymethylcomenic acid in acetic acid solution with hydrogen in the presence of a noble-metal catalyst to form 6-methylcomenic acid; and decarboxylating said 6-methylcomenic acid to form maltol.

4. A process for the preparation of maltol which comprises treating an aqueous solution of kojic acid adjusted to a pH of at least about 10 with oxygen in the presence of a noble metal catalyst to form comenic acid; treating said comenic acid with formaldehyde and a reagent selected from the group consisting of di-lower alkyl amines, morpholine, and piperidine to form a compound of the formula

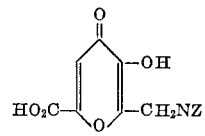

wherein NZ is selected from the group consisting of di-lower alkylamino, morpholino and piperidino; treating said compound under reducing conditions with a reagent selected from the group consisting of hydrogen activated by noble metal catalysts, alkali metal hydrosulfites, alkaline earth metal hydrosulfites, zinc hydrosulfite, ammonium hydrosulfite and metal-acid reducing agent combinations to form 6-methylcomenic acid; and decarboxylating said compound to form maltol.

5. A process for the preparation of maltol which comprises treating comenic acid with formaldehyde at a pH of at least about 7 to form 6-hydroxymethylcomenic acid; treating said 6-hydroxymethylcomenic acid under reducing conditions with a metal-acid reducing agent combination to form 2,3-dihydro-6-methylcomenic acid and treating said compound with lead tetraacetate and heat to form maltol.

6. A process as in claim 5 wherein said metal is zinc and wherein said acid is hydrochloric acid.

7. A process as in claim 5 wherein said metal is zinc and wherein said acid is acetic acid.

8. A compound of the formula

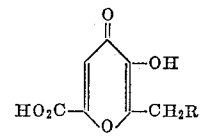

wherein R is selected from the group consisting of hydrogen, hydroxyl, chloro, bromo, iodo, di-lower alkylamino, piperidino and morpholino.

9. A compound as in claim 8 wherein R is hydrogen.
10. A compound as in claim 8 wherein R is hydroxyl.
11. 2,3-dihydro-6-methylcomenic acid.

References Cited in the file of this patent
UNITED STATES PATENTS
2,907,773    Krimmel _____ Oct. 6, 1959

OTHER REFERENCES

Woods: Journal American Chemical Society, vol. 68, page 2744 (1946).